United States Patent [19]
Capriotti

[11] Patent Number: 5,791,708
[45] Date of Patent: Aug. 11, 1998

[54] TRENCHING TOOL AND METHOD

[76] Inventor: Chris Capriotti, 27484 Oak Flat La., Clovis, Calif. 93611

[21] Appl. No.: 847,129

[22] Filed: May 1, 1997

[51] Int. Cl.[6] .................................................. A01B 1/00
[52] U.S. Cl. ............................ 294/55; 294/57; 172/377
[58] Field of Search ........................... 294/49, 55, 57, 294/19.1; 172/377, 381

[56] References Cited

U.S. PATENT DOCUMENTS

| | | | |
|---|---|---|---|
| D. 245,664 | 9/1977 | Holcombe | D8/10 |
| D. 256,322 | 8/1980 | Zabarte | D8/10 |
| 272,087 | 2/1883 | Rothman | 172/377 |
| D. 300,109 | 3/1989 | Zabarte | D8/11 |
| 528,607 | 11/1894 | Peat | 294/55 |
| 677,150 | 6/1901 | Zimmerman | 172/377 |
| 720,807 | 2/1903 | Horn | 172/381 |
| 861,107 | 7/1907 | Goggin | 172/377 |
| 2,318,277 | 5/1943 | Yensen | 294/49 |
| 2,618,501 | 11/1952 | Tallant | 294/55 |
| 3,782,770 | 1/1974 | Lee | 294/49 |
| 4,564,072 | 1/1986 | Corbett | 172/13 |
| 4,767,141 | 8/1988 | Martin | 294/55 |
| 4,848,818 | 7/1989 | Smith | 294/55 |
| 4,865,133 | 9/1989 | Dawley et al. | 172/380 |
| 4,865,372 | 9/1989 | Gabriel | 294/49 |
| 5,372,205 | 12/1994 | Velez | 172/371 |
| 5,502,871 | 4/1996 | Reyes | 294/55 |
| 5,529,129 | 6/1996 | Byrd | 172/377 |
| 5,533,768 | 7/1996 | Mitchell | 294/54.5 |

*Primary Examiner*—Dean Kramer

[57] ABSTRACT

The disclosed invention is a method and device for removing dirt and other debris from an open trench. The invention includes a tool with an elongated handle and a blade attached thereto. The blade is cantilevered from the support to allow positioning of dirt and other debris thereon. The combination creates an elongated shovel with a substantially flat bottom edge, so as to conform to the bottom of the trench. The handle and blade make a slightly acute angle one to another, with the center of gravity of the combination being below the handle when the handle is in a substantially vertical position and the placement of debris on the blade making little if any movement of that center of gravity. This method allows the user to stand directly over an open trench and remove soil with the tool with minimal displacement of the weight of the combination from the body of the user. This minimal displacement results in minimizing lower back stress while performing the task. Refilling of the trench is also assisted by allowing the user to be in an upright position with the blade of the tool flat on the ground and push or pull the soil back into the trench, without lifting the soil or putting the user in an awkward position.

19 Claims, 4 Drawing Sheets

5,791,708

TRENCHING TOOL AND METHOD

BACKGROUND OF THE INVENTION

1. Field of the Invention:

The invention herein relates to a hand tool suitable for digging in soil and more particularly to a hand tool and method for removal of soil and other debris from open trenches and the like and for the refilling of same.

2. Overview of Prior Art:

The task of removing soil and other debris from trenches has a useful purpose in the area of digging the foundations for structures and burying cables, including electrical and telephone lines. As the demand for construction and technology increases, so does the demand for efficiency in all aspects of the construction process. The evolution in the attempt of a more efficient tool to perform the task of trench digging is apparent in the art. As of yet, a design of a trenching tool that reduces job related injuries associated with hand tools has eluded the art.

In U.S. Pat. No. D256,322 to Zabarte, an ornamental design of an earth digging and trenching tool is disclosed. This includes a head that has a shortened blade with small raised edges to assist in capturing soil when the tool is used to remove debris from a trench and a pick on the opposite end for loosening compacted soil. The pick necessitates that the head be of a substantial weight in order to function effectively. This is consistent with the appearance of the tool as being of a cast metal such as iron. As is shown here, the blade portion is short and therefore of minimal effectiveness, allowing only for small amounts of debris to be removed with every pass. The unnecessary weight of the head creates excessive work that the user needs to do in accomplishing the task at hand. Also, the shortened blade virtually eliminates the effectiveness of backfilling or pulling dirt back into the trench.

A loop-type blade on a trenching tool is disclosed by Byrd in U.S. Pat. No. 5,529,129. The concept has merit, but the lack of practicality makes it extremely inefficient to use. The closed top of the loop does two things. First, it adds extra weight to the tool and second, it restricts the amount of dirt and other debris that can be piled onto the blade. Both are detrimental to the function of the device.

In U.S. Pat. No. 5,372,205 to Velez, a furrow covering hoe is disclosed. This is intended to be pulled behind the user and grade the dirt back into the furrow. The capability of such a device to be used to backfill a trench is minimal at best in that the width of the device limits the displacement of dirt from the open trench. Also, this device necessitates moving all of the dirt in a single pass. With most trenches, the amount of dirt required to move would make this task impossible with human power alone.

In an attempt to make the dirt moving task more friendly to the user's back, an ergonomic shovel was disclosed by Mitchell in U.S. Pat. No. 5,533,768. The stress reduction mechanism in the design is limited to a flexible portion in the base of the handle. The shovel is otherwise of a traditional design and function. Reducing back strain from the biomechanical loads applied to the user's back by the shoveling motion of the device is not addressed.

Lee, in U.S. Pat. No 3,782,770 disclosed a trenching tool with a blade, side walls and a handle. In this, the tool is disclosed as a series of parts that are fastened or welded together. The complexity of the tool makes it as undesirable to produce as does the excessive weight makes it use. In addition, the handle is positioned inclined only a small angle to the surface of the blade. The apparent intended use of such a tool is to be positioned with the blade perpendicular to the ground and apply force to the rear portion of the blade, such as by the foot of the user. To function as removing loose soil and other debris from a trench, the tool would make necessary the user's being inside the trench or bent over in a position that is suggestive of lower back injury. Being positioned inside the trench is many times not desirable or possible due to the size or location of the trench.

A weeding and furrowing tool is disclosed by Dewley, et al. in U.S. Pat. No. 4,865,133. The device includes a blade and handle with the handle at a slightly greater raised position to the blade with respect to Lee's disclosure, but with a drastically shortened blade and an absence of side walls on the blade. The blade includes a pointed tip with the upper surface on the blade angling down. This facilitates the soil in sliding off of the surface of the blade. Obviously detrimental to the process of removing debris from a trench, but useful in creating a shallow furrow in the surface of the soil.

In U.S. Pat. No. 4,564,072 Corbett disclosed a multipurpose garden tool which includes a handle and blade. The blade is substantially flat and positioned coplanar with the handle thereby, when in use, positioned substantially perpendicular to the soil surface. The blade includes a curved portion on the far end so as to create a furrowing effect similar to the Dewley patent. In terms of removing soil from a trench, the disclosed tool has very limited functionality.

Gabriel, in U.S. Pat. No. 4,865,372 disclosed a shovel-like digging hand tool with a back strain relief function. The device is complex and bulky. Both hands are used on the handle, positioned the same distance from the blade. This eliminates the ability of the user to apply a couple to the handle to maneuver, lift and move the debris, except for twisting the handle and blade. Movement of the debris is aided by the feature of wheels attached to the bottom of the blade. The ability to move the blade, by use of the handle, while maintaining minimal weight, are important features in the function of a trenching tool.

Two U.S. design patents, U.S. Des. Pat. No. D300,109 and D245,664 to Zabarte and Holcombe, respectively disclose trenching and digging tools that elicit some of the same shortcomings of the devices already mentioned. The Zabarte patent describes a pick with a shortened blade. The blade is minimal in length and includes no side walls to facilitate containment of the soil to be transported.

The Holcombe patent includes the ornamental design of a curved blade that is positioned substantially coplanar with the handle and includes a pair of extensions suitable for applying foot force to penetrate the blade into the soil. The blade also has no side walls, the combination therefore being of minimal value as a trenching tool.

SUMMARY OF THE INVENTION

The object of the disclosed invention is to provide a means of transporting dirt and other debris from an open trench. The invention utilizes a unique user to blade relationship to reduce stress on the lower back of the user and therefore increase the efficiency of the tool. The blade is elongated so as to increase the area of the blade and therefore the ability to support dirt and other debris thereon. The blade also may include side walls in the form of bent fins or a continuous rolled arc.

The handle is an elongated handle, the base of which is secured to the blade. The handle extends up away from the blade at something slightly less than ninety degrees to the blade surface, the center of gravity of the loaded combination being near the bottom of the vertically oriented handle. This allows the user to stand over an open trench, with handle in hand, and clean the bottom of the trench with a slightly rearward slope to the handle, loading the blade and vertically displacing the debris by pulling up on the handle while keeping the handle close to the user's body, thus minimizing lower back stress.

The task of refilling the trench with the excavated soil is also aided by the laying the blade on its side and pulling or pushing on the handle in the direction of the open trench. Typical shovels require vertical displacement of the soil, which is unnecessary work done or putting the user in an awkward position, such as on one or both knees to scrape the dirt into the trench.

DETAILED DESCRIPTION OF THE PREFERRED EMBODIMENT

Figures 1, 2:
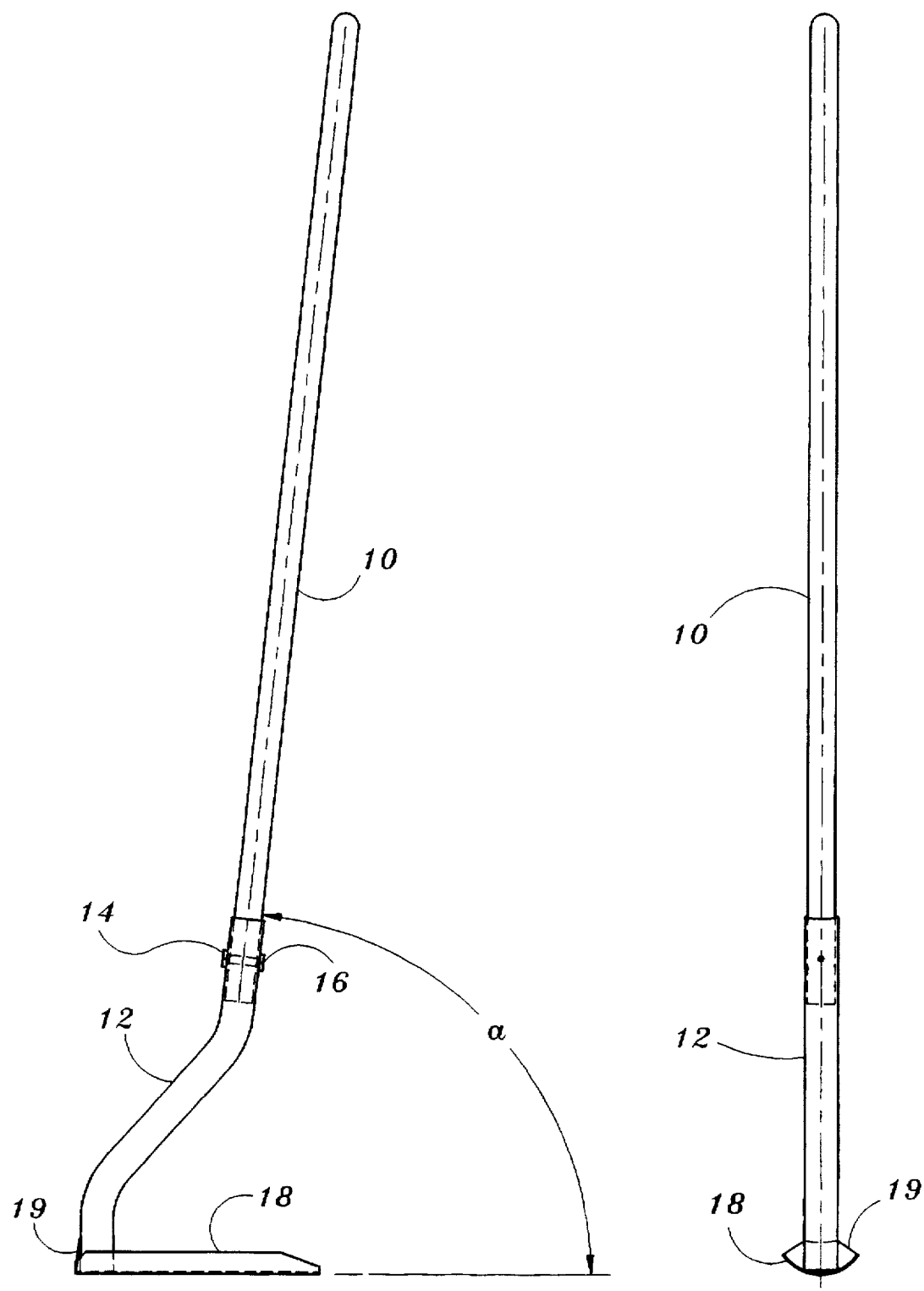
FIG. 1 is a side view of a trenching tool produced in accordance with the preferred embodiment of the present invention.
FIG. 2 is a front view of a trenching tool produced in accordance with the preferred embodiment of the present invention.

All buried cables, phone lines, pipes, sprinkler lines, building foundations and the like, have one thing in common, that is at least some portion runs under ground. In order to get them there, a variety of tools and machinery can be used to open a trench, lay the line or pipe and then back fill the trench with the new occupants. Regardless of the size or type of the trench, it is usually beneficial to have the bottom of the trench be clean and free of debris. Rocks under water filled pipes cause stress in the pipe and cable that snakes up and down requires unnecessary lengths of cable, as well as provides inconsistent depths, violating building codes and providing the possibility for interference with other lines. With this in mind, the invention of a superior tool to clean the trench, or even to dig the trench, is disclosed herein. Referring to the drawings, FIG. 1 shows a side view of the invention with a handle 10 which is preferably constructed out of wood or fiberglass approximately one to one and one half inches in diameter, preferably one and one quarter inches in diameter. The handle 10 is fastened to a handle support 12. Here a threaded fastener 14 and nut 16 accomplishes the task of securing one to the other. Equally practical methods of attachment include rivets, nails and chemical adhesives.

The handle support 12 is shown to be a hollow tube bent to provide a specific angle and location of the handle 10 to a blade 18. The upper end or free end of the handle support 12 is capable of receiving the bottom end of the handle 10 and the bottom end of the handle support 12 is secured to the blade 18. The most practical method of doing so is by welding, but fixing one to the other could be done using a variety of fastening means. A gusset 19 may be included to increase the strength of this attachment, but is not necessary in all cases. The handle 10 is elongated to provide sufficient distance between the user's hands and the blade 18 so as to allow the user to perform the task of cleaning the trench while maintaining a biomechanically correct upright position.

The lateral displacement of the handle 10 forward from the rear of the blade 18 roughly to the center of same provides a balance to the combination in that the handle will hang substantially vertical, with and without the blade 18 being loaded with debris. By keeping the center of gravity low and substantially collinear with the handle allows the handle to be kept close to the body when using it. This keeps the moment arm of the load on the injury sensitive lower back to a minimum. The angle a between the handle 10 and the blade 18 is slightly less than 90 degrees, here shown to be 86 degrees, but the optimal design can run between 60 and 89 degrees. When the handle 10 hangs vertically, blade 18 is tilted slightly upward toward the rear, thus assisting in keeping the debris on the blade 18.

The invention is further depicted in FIG. 2. Here the handle 10 is attached to the handle support 12 which is joined to the blade 18 with the gusset 19. This view shows the preferred embodiment of the blade 18 in that it includes an arcuate surface which is concave in the upward direction. This concave surface would further allow the dirt and other debris to be secured on the blade 18. The invention would function with a flat blade, but the side walls provided by the arcuate design add increased strength and material handling capabilities that enhance the function of the device.

Figure 3:
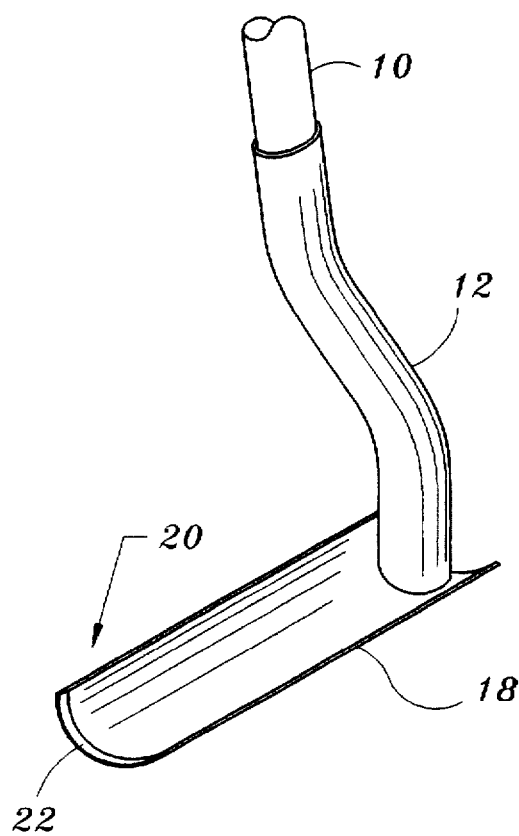
FIG. 3 is an isometric view of the blade and handle support of a trenching tool produced in accordance with the preferred embodiment of the present invention.

A more detailed view of the handle support 12 and the blade 18 is shown in FIG. 3. The handle 10 has been cleaved off to show the rest of the invention including the blade 18. Here it can be seen the front edge 20 of the blade 18 which includes a beveled portion 22. This is one method of adapting the blade 18 to be able to penetrate soil. The arcuate structure of the blade 18 is also depicted in that dirt and other debris would be received on the blade 18 within the arcuate portion, typically entering from the front edge 20 by use of the beveled portion 22. No fastener is visible in securing the handle 10 to the handle support 12, but is shown here to use an adhesive to accomplish this task.

Figure 4:
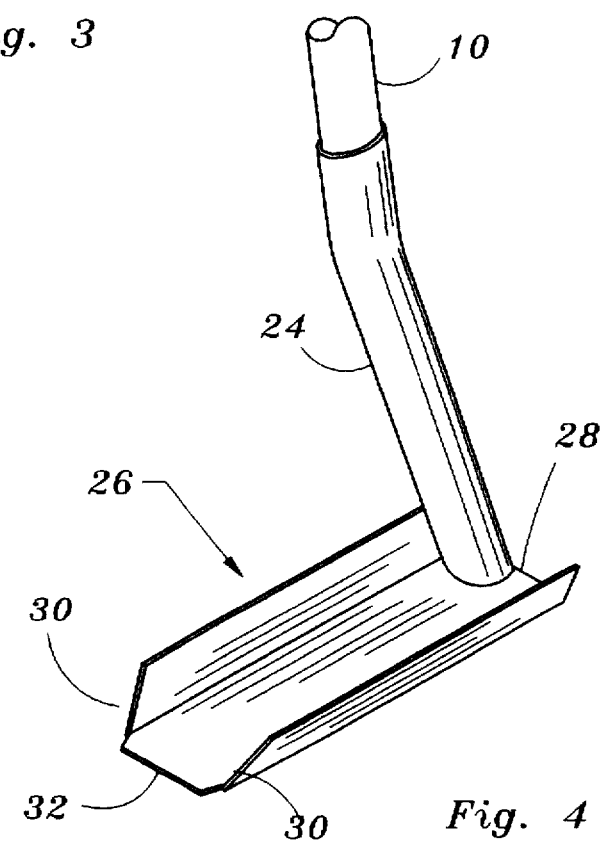
FIG. 4 is an isometric view of the blade and handle support of an alternative to the preferred embodiment of a trenching tool.

An alternative to the preferred embodiment is shown in FIG. 4 in that the angled handle support 24 is made with one bend and secured to the flat bottom blade 26 at an angle thereto. The flat bottom blade 26 includes a bottom portion 28 and two adjacent side portions 30 made to be continuous therewith. An adaptation for penetration into soil is made on the beveled lip 32 on the front of the blade 26. As before, the critical location of the handle 10 to the blade 26 would be consistent with that as previously disclosed and the function of which is predominantly the same. The combination of the bottom portion 28 and the side portions 30 create a supportive surface to hold debris in a manner similar to the arcuate blade. Aesthetic appeal and manufacturing costs make the former more advantageous, but the inventor wishes to disclose this as a functional alternative. Both blades are shown to be non-enclosed in that the top of the blades are open. A cylindrical blade would reduce the function of the invention in that more unnecessary weight would be added that would accomplish little more than restricting the amount of debris that could be placed on the blade and potentially cause the debris to get stuck within the blade. Either design as disclosed herein would not enable such complications.

Figure 5:
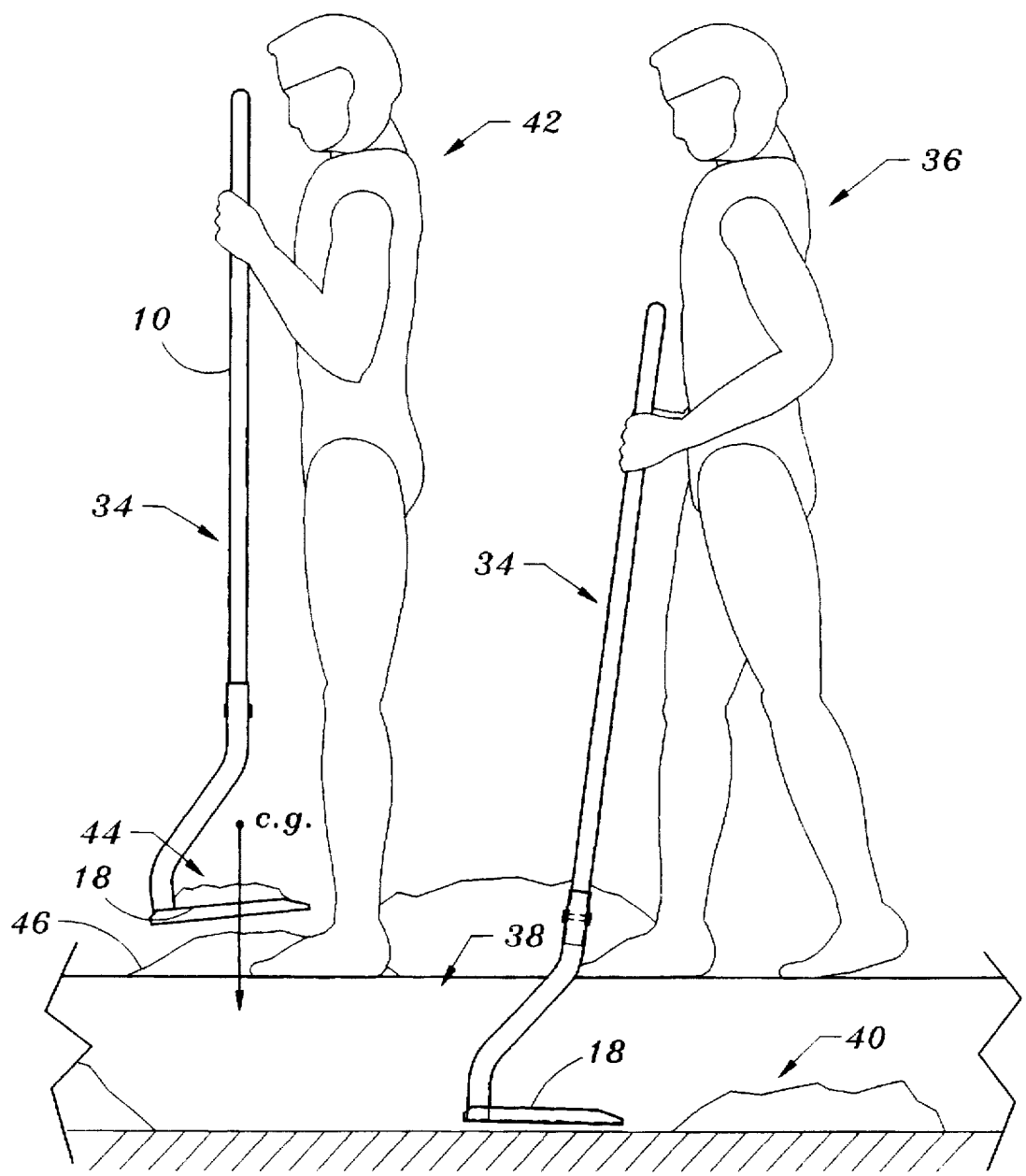
FIG. 5 is a side view of two trenching tools as they would be typically used in cleaning out an open trench, the tools produced in accordance with the preferred embodiment of the present invention.

The use of the invention is further shown in FIG. 5, where two individuals are depicted using the invention 34 at two stages of the digging process. The first individual 36 is shown with the invention 34 in the trench 38. The trench 38 has been opened to more easily view the function of the invention 34. Debris 40 remaining in the trench 38 is positioned in front of the blade 18. The user 36 can move the invention 34 rearward to engage the debris 40 retaining a portion thereon. The second individual 42 is shown with a portion of the debris 44 on the blade 18. The approximate center of gravity of the combination is denoted by the abbreviation "e.g." in which it is in alignment with the axis of the handle when the handle 10 is in a vertical position. This allows the user to keep the combination very close to the user's 42 body while the debris 44 is displaced out of the trench 38 and piled on the mound 46 on the side. No additional forces must be applied to the handle 10 to keep it in this position as would be necessary with other devices. These additional forces would have horizontal components that would be reacted to by the body. These forces would undoubtedly result in stress on the lower back of the user. Lower stress not only means less chance for injury, but greater load can be carried in each scoop without the risk of injury, thereby increasing productivity.

Figure 6:
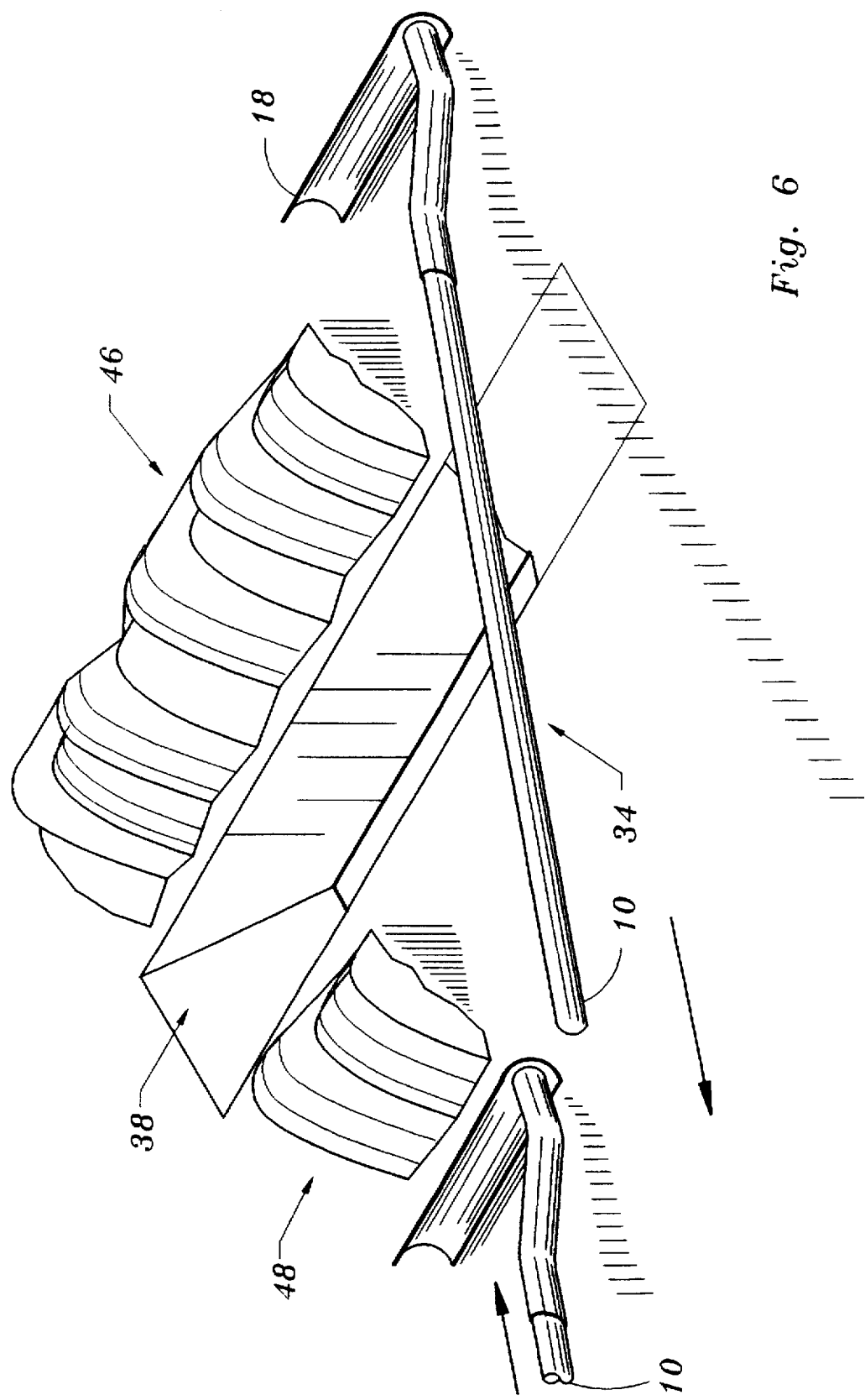
FIG. 6 is an isometric view of a trenching tool produced in accordance with the preferred embodiment of the present invention, showing how it would typically be used to backfill an open trench by pulling or pushing on the handle.

After the pipe or cable is laid, the task of refilling or back filling the trench presents itself. The simplification of this task is depicted in FIG. 6 with the invention 34 in a moderately inclined from prone position and the blade 18 laying on it's side on the ground. The mound 46 is contacted by the blade 18 and pulled into the trench 38 by pulling on the handle 10 of the invention. The concave portion of the blade 10 assists in retaining the debris to be moved, as in the digging process and also, as before, the center of the blade is substantially in alignment with the axis of the handle 10 thereby allowing the user's stronger muscles to pull the debris into the trench 38 without relying on weaker muscles to twist or pivot the tool to perform the task, as is done with a common shovel and other trenching tools. It is not uncommon for a second mound 48 to be on the other side of the trench 38, thus placed on both sides of the trench 38. If the user desires to stand on one side, the tool may be used to push or pull on the handle 10 of the invention thereby moving the soil into the trench, as shown here, thus filling same.

What is claimed is:

1. A hand tool comprising:
    a non-enclosed blade having a first end and a second end, thereby defining a blade axis, the first end comprising a cutting edge capable of penetrating soil, and the blade being capable of receiving soil and supporting same thereon along the blade axis;
    a substantially longitudinal handle support with one end secured to said second end of said non-enclosed blade and an open end of the handle support extending away from said non-enclosed blade; and
    an elongated handle with a first end capable of securing to said open end of said handle support, and a second end extending away from said handle support, the handle being coplanar with said blade axis the handle creating an acute angle with the blade axis, wherein said handle support provides portioning of the handle's long axis such that the extension of same would intersect the blade axis in the proximity of the midpoint of the blade axis, whereby the user can grasp the handle and lift the hand tool, including debris piled on the blade, without providing a horizontal force component to the handle in order to place the blade axis in a slight incline to the horizontal, thereby assisting in maintaining the debris on the blade and eliminating forces that could result in back strain for the user.

2. The hand tool as described in claim 1, wherein said non-enclosed blade is further comprised of a bottom blade with a first end and a second end, the first end comprising a cutting edge capable of penetrating soil, and two side edges located adjacent to the first and second ends; and
    at least two side blades, each blade forming a raised edge on each of said side edges of said bottom blade, thereby forming a structure for objects to be supported thereon.

3. The hand tool as described in claim 1, wherein said non-enclosed blade is further comprised of an arcuate bottom blade with a first end and a second end, the first end comprising a cutting edge capable of penetrating soil, and two side edges which extend up to form side blades thereof, thereby forming a structure for objects to be supported thereon.

4. The hand tool as described in claim 1, wherein said handle support is comprised of a tube with said open end capable of receiving said handle.

5. The hand tool as described in claim 1, wherein said elongated handle is comprised of a 1 ¼ inch diameter wooden rod.

6. The hand tool as described in claim 1, wherein said elongated handle is comprised of a 1 ¼ inch diameter fiberglass rod.

7. The hand tool as described in claim 1, wherein said elongated handle is secured to said open end of said handle support by use of at least one fastener.

8. The hand tool as described in claim 7, wherein said fastener is a fastener selected from the group consisting of a threaded bolt and nut, a rivet, a nail and chemical adhesives.

9. The hand tool as described in claim 1, wherein said acute angle is an angle between sixty and eighty-nine degrees.

10. A hand tool comprising:
    a non-enclosed blade having a first end and a second end, thereby defining a blade axis, the first end comprising a cutting edge capable of penetrating soil, and the blade being capable of receiving soil and supporting same thereon along the blade axis;
    a substantially longitudinal handle support with one end secured to said second end of said non-enclosed blade and an open end of the blade and an open end of the handle support extending away from said non-enclosed blade; and
    an elongated handle with a first end capable of securing to said open end of said handle support, and a second end extending away from said handle support, the handle providing a point thereon that is directly above the center of gravity of the hand tool when the handle is in a substantially vertical orientation while said blade axis is in a slightly inclined orientation toward the first end, wherein said handle support provides positioning of the handle's long axis such that the extension of same would intersect the blade axis in the proximity of the midpoint of the blade axis, whereby the user can grasp the handle and lift the hand tool, including debris piled on the blade, without providing a horizontal force component to the handle in order to maintain the debris on the blade, thereby eliminating forces that could result in back strain for the user.

11. The hand tool as described in claim 10, wherein said non-enclosed blade is further comprised of a bottom blade with a first end and a second end, the first end comprising a cutting edge capable of penetrating soil, and two side edges located adjacent to the first and second ends; and at least two side blades, each blade forming a raised edge on each of said side edges of said bottom blade, thereby forming a structure for objects to be supported thereon.

12. The hand tool as described in claim 10, wherein said non-enclosed blade is further comprised of an arcuate bottom blade with a first end and a second end, the first end comprising a cutting edge capable of penetrating soil, and two side edges which extend up to form side blades thereof, thereby forming a structure for objects to be supported thereon.

13. The hand tool as described in claim 10, wherein said handle support is comprised of a tube with said open end capable of receiving said handle.

14. The hand tool as described in claim 10, wherein said elongated handle is comprised of a 1 ¼ inch diameter wooden rod.

15. The hand tool as described in claim 10, wherein said elongated handle is comprised of a 1 ¼ inch diameter fiberglass rod.

16. The hand tool as described in claim 10, wherein said elongated handle is secured to said open end of said handle support by use of at least one fastener.

17. The hand tool as described in claim 16, wherein said fastener is a fastener selected from the group consisting of a threaded bolt and nut, a rivet, a nail and chemical adhesives.

18. The hand tool as described in claim 10, wherein said acute angle is an angle between sixty and eighty-nine degrees.

19. A method of removing debris from an open trench including the steps of:

providing a means of supporting a non-enclosed blade, the blade being adapted to be able to penetrate soil;

providing a handle means for the user to grasp at a free end thereof and a second end supporting the non-enclosed blade;

allowing gravitational force to orient the handle in a substantially vertical position, do at least partially to the non-enclosed blade;

allowing the handle to remain substantially vertical when said non-inclosed blade is loaded with debris, and applying only vertical force on the handle, with debris loaded on the non-inclosed blade, thus providing displacement of the debris.

* * * * *